United States Patent [19]

Greenlee et al.

[11] Patent Number: 5,180,267
[45] Date of Patent: Jan. 19, 1993

[54] APPARATUS FOR PLASTIC BODY PANEL ATTACHMENT

[76] Inventors: Fredrick E. Greenlee, 2825 Hastings Rd., Silver Lake, Ohio 44224; Charles T. Barnhardt, 1000 W. Highland Rd., Howell, Mich. 48843

[21] Appl. No.: 761,418

[22] Filed: Sep. 17, 1991

[51] Int. Cl.⁵ .................... F16B 37/08; F16B 39/28
[52] U.S. Cl. ................................ 411/432; 411/113; 411/908; 296/198; 296/901
[58] Field of Search ............ 411/82, 112, 113, 301, 411/302, 427, 432, 182, 908; 296/29, 187, 198, 901

[56] References Cited

U.S. PATENT DOCUMENTS

| | | | |
|---|---|---|---|
| 4,438,971 | 3/1984 | Zaydel et al. | 296/901 |
| 4,804,303 | 2/1989 | Statkus | 411/908 |
| 4,818,164 | 4/1989 | Kazyak | 411/182 |
| 4,863,330 | 9/1989 | Olez et al. | 411/908 |
| 4,868,968 | 9/1989 | Dixon et al. | 411/908 |
| 5,079,055 | 1/1992 | Doyle | 411/908 |

*Primary Examiner*—Neill R. Wilson
*Attorney, Agent, or Firm*—Oldham, Oldham & Wilson Co.

[57] ABSTRACT

An improved mill and drill pad fastener is described which uses a base and a polymeric pad which is less susceptible to cracking when a torque is applied such as is generated when a self-tapping screw is used. The improved fastener eliminates the need for a metal-reinforcing band around the polymeric pad component by the geometric design of the base, which also eliminates the ability of the pad to twist or to be pulled from the base. Additionally, a completely polymeric mill and drill pad fastener is described.

14 Claims, 3 Drawing Sheets

APPARATUS FOR PLASTIC BODY PANEL ATTACHMENT

TECHNICAL FIELD

This invention relates to an improved mill and drill pad fastener using a heat-stabilized fiber-reinforced polymeric composition for the pad, the fastener being effective as a panel to subassembly attachment component in new vehicle construction.

BACKGROUND OF THE INVENTION

Mill and drill pad fasteners are commonly used in newer vehicle production for the attachment of polymeric body components to vehicle subassemblies. Traditional mill and drill pad fasteners are currently manufactured by using an extruded metal sheet configured to create a metal reinforcing band into which an epoxy or polyvinyl resin such as polyvinylchloride (PVC) is molded.

There are two main problems with the current mill and drill pad fastener. First, as self-tapping screws are inserted and screwed into the epoxy or PVC resin, the polymeric component of the fasteners tends to crack when a torque in excess of 5-5.5 Newton-meters is applied to the screw in the fastener.

And second, there is a problem in the ability to mill the fastener to the desired height. Since rarely is a vehicle assembled perfectly centered on its axis, there is the need to mill the fasteners to the desired height. With traditional fasteners, the presence of a reinforced metal band, which surrounds the polymeric pad, causes a rapid deterioration of the cutting edge of the milling tools used.

SUMMARY OF THE INVENTION

Through the combination of a geometric shaped base plate, in association with a more resilient polymeric pad, which does not have a metallic band support, a mill and drill pad fastener for use in newer vehicle assembly can be produced which will decrease the overall manufacturing costs of the vehicle.

It is a first object of this invention to produce a mill and drill pad fastener which uses a geometric shape to prevent the polymeric pad from rotating due to the rotational forces created by screwing a self-tapping screw into the pad.

It is a second object of this invention to produce a mill and drill pad fastener which does not contain a metal-reinforcing band.

It is a third object of this invention to produce a mill and drill pad fastener which is resistant to stress-cracking caused by the rotational forces created by screwing a self-tapping screw into the pad.

It is a fourth object of this invention to produce a mill and drill pad fastener which is inexpensive to manufacture.

It is a fifth object of this invention to produce a mill and drill pad fastener which does not require changes to the existing current production panel to subassembly fastening process.

It is a sixth object of this invention to produce a mill and drill pad fastener which will give extended milling life to the cutting tools due to the elimination of the metal sidewall.

It is a seventh object of this invention to produce a mill and drill pad fastener which is unitary in construction.

DETAILED DESCRIPTION OF THE DRAWINGS

DETAILED DESCRIPTION OF THE INVENTION

Figure 1:
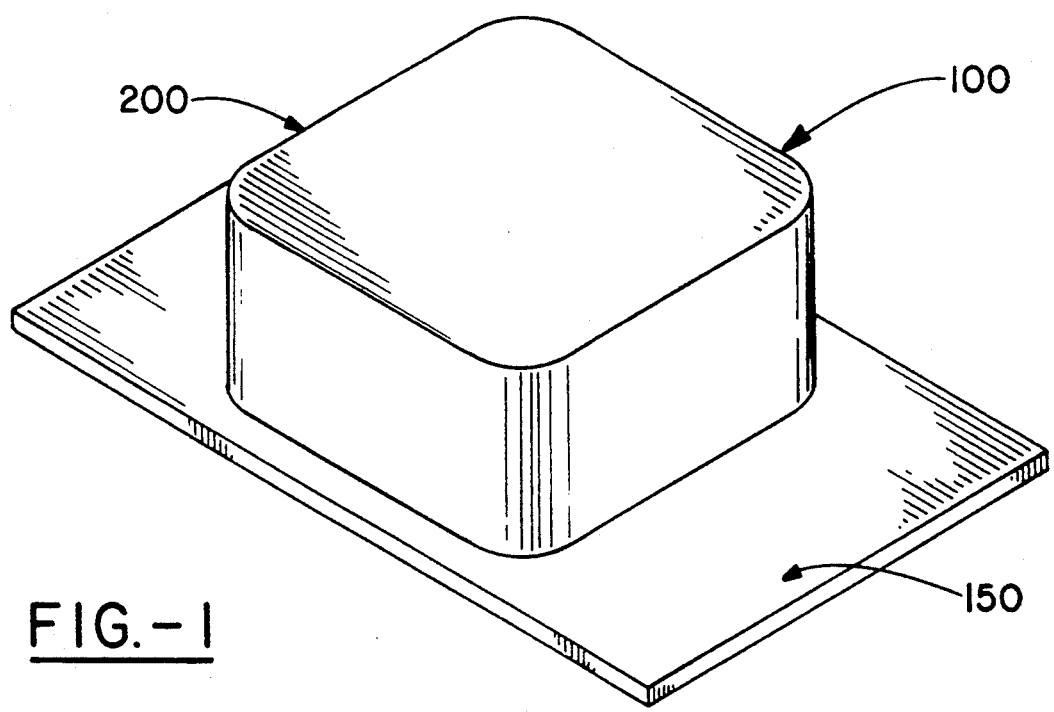
FIG. 1 is a perspective view of the improved mill and drill pad fastener.
Figure 3:
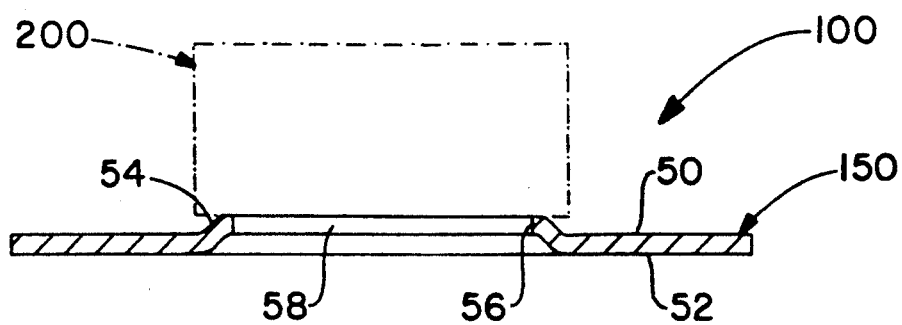
FIG. 3 is a cross-sectional side elevational view of the base of the improved mill and drill pad fastener.
Figure 4:
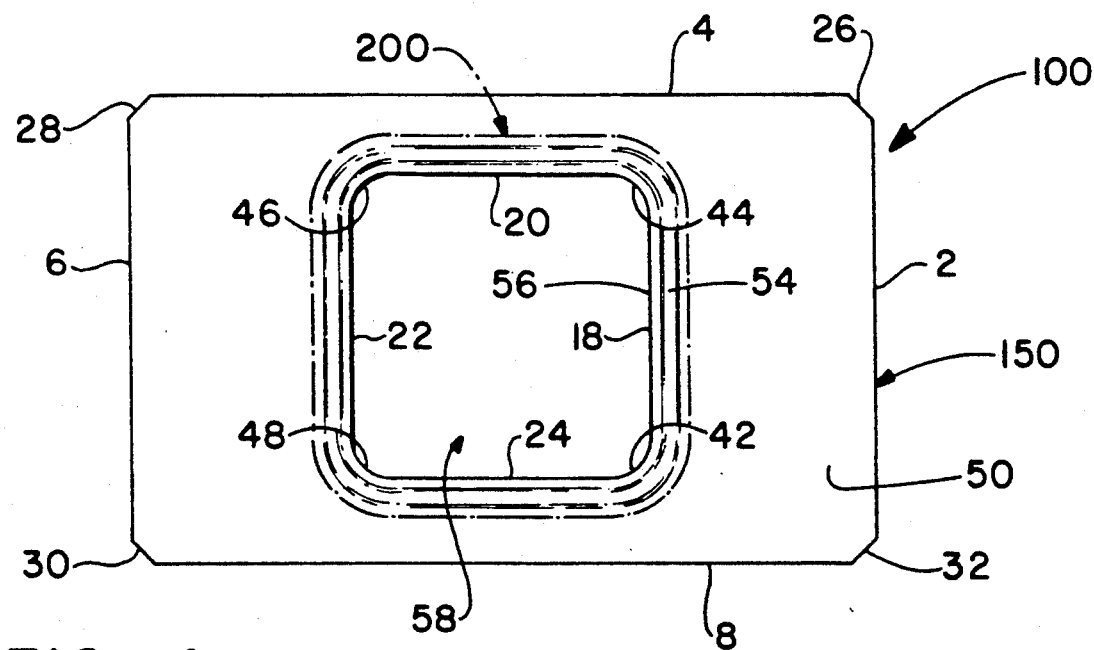
FIG. 4 is a top view of the mill and drill pad fastener.

As seen in FIG. 1, mill and drill pad fastener (100) is essentially comprised of two components; base (150) and polymeric pad (200). As best illustrated in FIGS. 3 and 4, base (150) is essentially rectangular with a pair of parallel sides (2,6) and (4,8). In one embodiment of the invention, base (150) has corners (26,28,30,32) clipped thereby minimizing the potential for damage, either to the operator or to the polymeric body panel, which might occur if the corners were sharp. Base (150) has an upper surface (50) and a lower surface (52).

In a preferred embodiment of this invention, base (150) is steel, although other metals and their alloys are envisioned to be applicable to this invention. The dimensions of base (150) can vary, depending upon the requirements of the application. However, in general, the dimension along a longitudinal axis is greater than the dimension along the axis normal to the longitudinal axis.

As seen in FIGS. 3 and 4, upper surface (50) of base (150) is generally flat, except for raised arcuate region (54) which terminates at lip (56). Lip (56) has opposing sides (18,22) and (20,24) which form aperture (58). In one embodiment of the invention, the raised arcuate lips have rounded corners (42,44,46,48). In a preferred embodiment, the raised arcuate lips are generally in the shape of a parallelogram, which is easy to fabricate through a stamping process.

While a generally rectangular or square opening is shown, any closed polygon or non-circular shape will perform satisfactorily. The key to the non-circular requirement lies in the fact that as a self-tapping screw is tightened into the mill and drill pad fastener, the torque generated by the screwing motion would have the potential to cause rotation of pad (200).

Figure 6:
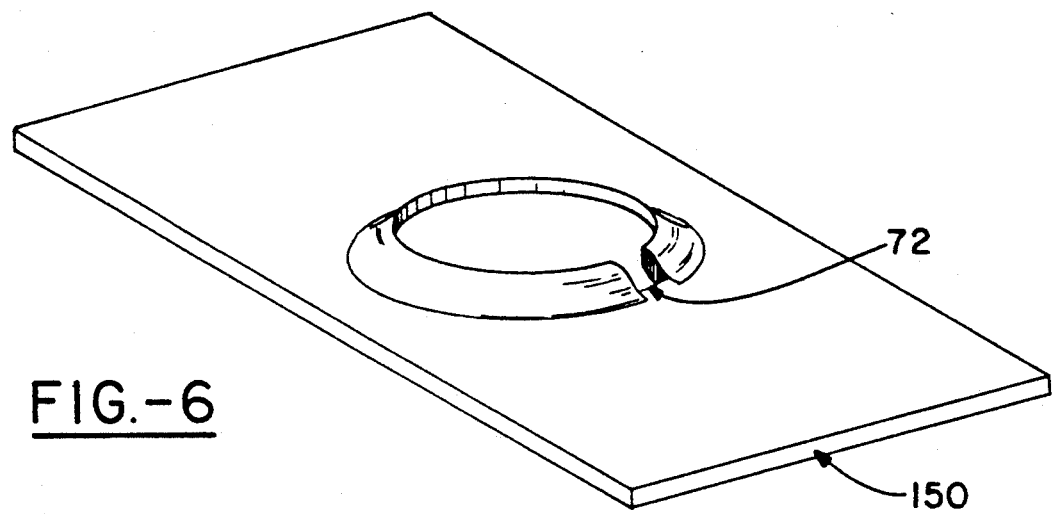
FIG. 6 is a perspective view of the mill and drill pad base with a circular aperture and a notch in the circular aperture.

The potential for circular rotation however, does not preclude the use of a circular opening, as shown in FIG. 6. When using a generally circular opening, at least one notched groove (72) is required. This notched groove tends to minimize the potential for rotation caused by the torque generated by the screwing motion. In a preferred embodiment, a plurality of notched grooves would be present in lip (56).

Figure 5:
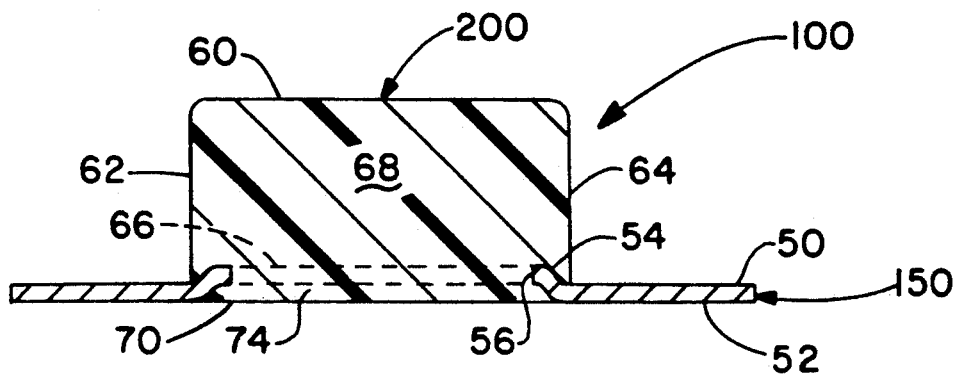
FIG. 5 is a cross-sectional side elevational view of the mill and drill pad fastener.

As seen in FIG. 5, horizontal plane (66) across raised arcuate lips (56) and horizontal plane (70) define inner region (74) Outer region (68) is defined by upper surface

(60) and side walls (62,64). These side walls extend beyond raised arcuate region (54) and terminate at upper surface (50).

Inner region (74) and outer region (68), together form pad (200). The composition of pad (200) must be such that it can withstand heating cycles of 350°-375° F. for thirty minutes to one hour with minimal physical distortion. This requirement limits the number of available polymeric materials which can be used in this application. Epoxy and PVC resins have been used in the past, however, these resins are typically brittle and tend to crack upon penetration of a self-tapping screw. This has necessitated the metallic band around the epoxy or PVC resin, which inhibits this tendency. However, metal bands are hard on milling tools.

Figure 2:
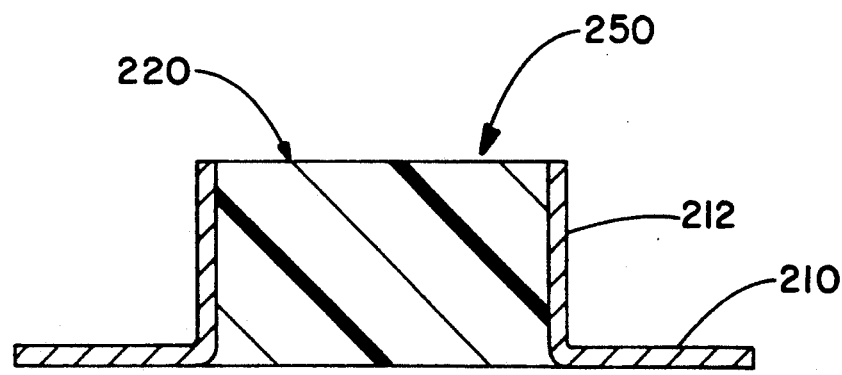
FIG. 2 is a cross-sectional side elevational view of a prior art mill and drill pad fastener.

FIG. 2 illustrates a prior art solution to this problem. Base (210) is extruded to form metallic band (212) forming an aperture (220) Epoxy or PVC resin is molded into aperture (220) and cooled. While this banded prior art configuration does prevent catastrophic failure of the polymeric pad fastener by inhibiting the ability of the cracks to physically chip from the pad, it correspondingly makes it more difficult to mill the metallic-banded pad fastener.

By replacing epoxy or PVC resin with a more resilient polymer, such as a fiber-reinforced polyamide, such as nylon, and utilizing the base design of the invention, a significant increase in the life of the milling tools can be achieved as the need for a metallic band is eliminated. As used in this application, pad (200) is of unitary construction. The polymer is heated above its glass-transition temperature ($T_g$) and injection molded into a mold which upon cooling of the polymer, is removed, thereby forming pad (200) with coherent inner (74) and outer (68) regions. Since the maximum diameter of inner region (74) is larger than that of the diameter between lips (56), pad (200) is firmly affixed within base (150).

Additionally, due to the geometric shape of aperture (58), the torque generated by a screwing force applied to a self-tapping screw, pad (200) will not rotate within base (150). This is true even when the opening is circular, due to notch (72).

In a preferred embodiment, the polymer used is a glass-reinforced nylon-6,6. In a more preferred embodiment, the ratio of the glass-reinforced nylon-6,6 is 10-40% by weight glass fiber. Since glass-reinforcing fibers come in both long and short fibers, in a most preferred embodiment, the glass fiber is the short fiber. Such a polymer is commercially available from Hoechst-Celanese as Celanese ® heat-stabilized, short fiber-reinforced nylon-6,6. The nylon may be used in its natural color, or with pigmentation such as carbon black or suitable organic or inorganic dyes added. It is within the scope of this invention to incorporate other weight percentages of reinforcing fibers.

Other materials with similar characteristics are envisioned to be applicable and within the scope of this invention. In general, the key to such alternatives lies in the ability of a product to meet the following sets of physical, strength, toughness and stiffness parameters. In a preferred embodiment, the polymer will have a specific gravity of about 1.23-1.47; a tensile strength of about 17,000-32,000; a shear strength of about 13,000; a notched izod impact of 0.9-2.6; and a tensile elongation of about 2-4. Such alternatives which approximate the above set of physical characteristics are polyphenylene sulfide (PPS), liquid crystalline polymer (LCP), polyethylene terephthalate (PET), reinforced thermoplastics, and glass-reinforced aromatic polyamides, including both long and short fiber, the weight percentages of glass-reinforcing fibers ranging from 14-40%.

Figure 7:
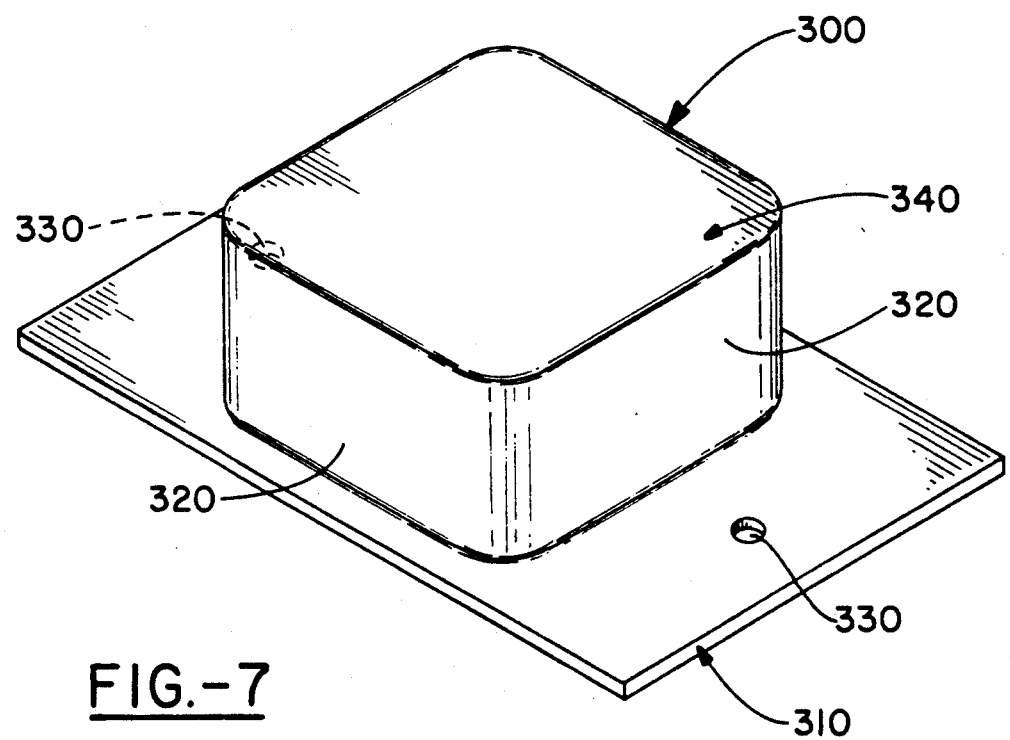
FIG. 7 is a perspective view of a unitary polymeric mill and drill pad.

In addition to the two-component mill and drill pad fastener, a unitary fastener can be fabricated. As shown in FIG. 7, this unitary polymeric mill and drill fastener (300) is molded as one piece. When fabricated in this manner, the fastener comprises a flat surface or base (310) and raised pad (340) defined by sidewalls (320) integrally molded with flat surface (310). Since there is no potential for rotation as was the case with the two-component fastener described previously, there is no need for any particular geometric shape for pad (340). The pad can be generally shaped as a rectangle, parallelogram, polygon, triangle, circle, oval, or any other suitable regular or irregular geometric shape. The pad can be dimensioned to co-terminate with the longitudinal sides of base (310) or can terminate short of the sides.

Since fastener (300) cannot be attached by ordinary metal-crimping means, as is the case with fastener (100), a plurality of holes (330) are generally molded into the fastener. These holes will serve as the attachment points for self-tapping screws into the subassembly of the vehicle. Alternatively, any known fastening means can be employed to attach the fastener to the subassembly of the vehicle. Typical materials of construction are similar to those described for fastener (100).

EXAMPLES

It is envisioned that the objects of this invention will become clearer through the following example. A method of preparing the mill and drill pad of the instant application is disclosed in Example 1.

EXAMPLE 1

The mill and drill pad of the instant invention can be manufactured using several different types of equipment. In general, the polymeric pad is attached to the base by an injection molding process. Injection molding is known in the art and does not constitute a part of the invention as described herein. In its most simplified form, injection molding involves (1) heating a polymer above its melting point, but below a temperature sufficient to cause significant degradation of the polymer; (2) injecting a measured amount of liquid polymer into the mold; (3) allowing the material in the mold to cool under high pressure; and (4) ejecting the finished product from the mold.

In particular, heat-stabilized, 33 weight percent glass-reinforced nylon-6,6 (melting range of 500°-550° F.) was fed into an injection molding machine. A nozzle temperature of between 540°-700° F., more preferably 550°-600° F. was maintained at the nozzle end. Base pieces were loaded into the mold, followed by a 10 second injection period. After allowing a 35 second cure time for the press cycle, the finished parts are removed from the mold.

It is well-known in the art that longer or shorter times and different temperatures would be utilized to adjust to the different polymers which could be injection molded as the polymeric pads.

DISCUSSION

The following test procedure was employed to compare the performance of a prior art fastener with the improved fastener of this invention. A pilot hole of 5.2 mm was drilled at various locations on center and off-center to a depth of one-half of the thickness of the fastener to aid in the start of the 6.3 mm self-tapping screw. The fasteners were baked at 375° F. for one hour to simulate actual plant manufacturing conditions, e.g. vehicle painting. The fasteners were torqued down to 5 Newtonmeters. To test the ability of the fastener to withstand cycling conditions, the fasteners were baked at 270° F. for 35 minutes, allowed to cool at room temperature for 35 minutes, followed by a repeat of the baking/cooling cycle. The fasteners were inspected for torque loss and/or cracking of the pad. While there was some cracking of PVC and epoxy fasteners, there was none observed when using the glass-reinforced nylon fastener.

An additional set of data was obtained under more strenuous testing conditions as shown in Table 1.

TABLE 1

| polymeric pad composition | Torque applied (newton-meters) | fastener pad cracking |
|---|---|---|
| Polyvinyl-chloride | <5.5 | yes |
| glass-reinforced nylon-6,6 | >10+ | no |

With a 5.2 mm pilot hole, the nylon fasteners were torqued to 10+ Newton-meters, with no cracking or breaking of the pad. This is in sharp contrast to the prior art resin-based fastener pad which exhibited breakage at torques of 5.5 Newton-meters or less.

While in accordance with the patent statutes, a best mode and preferred embodiment have been described in detail, the invention is not limited thereto, rather the invention is measured by the scope of the attached claims.

What is claimed is:

1. A fastener for use in attaching a panel to a subassembly, the fastener being capable of withstanding repeated temperature swings of up to about 300° F. above a room temperature of about 70° F. without torque loss of a self-tapping screw inserted into the fastener comprising:
   (a) a metallic base having an upper and a lower surface, the base additionally having an aperture disposed within the base;
   (b) a raised arcuate lip around the aperture in the base, the lip defining a lower region; and
   (c) a polymeric pad extending through the aperture, the pad being positioned such that a first portion of the pad extends into the lower region essentially terminating along a longitudinal plane of the lower surface of the base and a second portion of the pad extends above the lip.

2. The fastener of claim 1 wherein the polymer pad comprises:
   (a) a thermoplastic; and
   (b) a reinforcing fiber.

3. The fastener of claim 2 wherein the thermoplastic is a polyamide.

4. The fastener of claim 3 wherein the polyamide is a nylon.

5. The fastener of claim 4 wherein the polyamide is a nylon-6,6.

6. The fastener of claim 2 wherein the reinforcing fiber is glass.

7. The fastener of claim 6 wherein the reinforcing fiber is a short fiber.

8. The fastener of claim 7 wherein the reinforcing fiber is 10-40% by weight.

9. The fastener of claim 1 wherein the polymer of the polymer pad is selected from the group consisting of polyphenylene sulfide, liquid crystal polymer, polyethylene terephthalate, and long-fiber reinforced thermoplastics.

10. The fastener of claim 1 wherein the aperture is essentially a non-circular polygon.

11. The fastener of claim 10 wherein the aperture is essentially a parallelogram with rounded corners.

12. The fastener of claim 1 wherein the aperture is essentially circular.

13. The fastener of claim 12 wherein the aperture is essentially circular and the raised lip contains at least one notch in the lip.

14. A unitary-molded thermoplastic, fiber-reinforced polymeric fastener for use in attaching a panel to a subassembly, the fastener being capable of withstanding repeated temperature swings of up to about 300° F. above a room temperature of about 70° F. without torque loss of a self-tapping screw inserted into the fastener comprising:
   (a) a base having an upper and a lower surface, the surfaces being essentially parallel to each other; and
   (b) a pad extending above a longitudinal plane of the base in a direction normal to the longitudinal plane of the base, a pad base being contiguous with a portion of the upper surface of the polymeric base, and wherein the thermoplastic is selected from the group consisting of nylon, polyphenylene sulfide, liquid crystal polymer, polyethylene terephthalate, and long and short fiber reinforced thermoplastics, and the fiber-reinforcing is glass, the fiber-reinforcing being 10-40% by weight of the fastener, the pad further being resistent to cracking and facilitated milling as a result of a combination of the thermoplastic fiber-reinforced polymer.

* * * * *